(12) United States Patent
Chen

(10) Patent No.: US 12,112,559 B2
(45) Date of Patent: Oct. 8, 2024

(54) IMAGE PROCESSING METHOD, IMAGE PROCESSING APPARATUS, AND IMAGE PROCESSING SYSTEM

(71) Applicant: Wistron Corporation, New Taipei (TW)

(72) Inventor: Yin-Zong Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 196 days.

(21) Appl. No.: 17/840,635

(22) Filed: Jun. 15, 2022

(65) Prior Publication Data

US 2023/0306763 A1  Sep. 28, 2023

(30) Foreign Application Priority Data

Mar. 24, 2022 (TW) .................................. 111111079

(51) Int. Cl.
*G06V 20/70* (2022.01)
*G06F 16/51* (2019.01)
*G06T 3/40* (2024.01)
*G06T 7/70* (2017.01)
*G06V 10/22* (2022.01)

(52) U.S. Cl.
CPC ............. *G06V 20/70* (2022.01); *G06F 16/51* (2019.01); *G06T 3/40* (2013.01); *G06T 7/70* (2017.01); *G06V 10/22* (2022.01); *G06T 2200/24* (2013.01); *G06T 2207/20212* (2013.01); *G06V 2201/07* (2022.01)

(58) Field of Classification Search
CPC .... G06V 20/70; G06V 10/22; G06V 2201/07; G06T 7/70; G06T 3/40; G06T 2200/24; G06T 2207/20212; G06F 16/51
See application file for complete search history.

(56) References Cited

U.S. PATENT DOCUMENTS

| | | | | |
|---|---|---|---|---|
| 2002/0044691 A1* | 4/2002 | Matsugu | ................. | G06V 10/10 382/218 |
| 2004/0066970 A1* | 4/2004 | Matsugu | ................. | G06V 10/10 382/217 |
| 2017/0243077 A1* | 8/2017 | Fukui | ................... | G06V 10/464 |

FOREIGN PATENT DOCUMENTS

| | | |
|---|---|---|
| CN | 113570619 | 10/2021 |
| CN | 114171167 | 3/2022 |

OTHER PUBLICATIONS

"Office Action of Taiwan Counterpart Application", issued on Nov. 14, 2022, p. 1-p. 18.

* cited by examiner

*Primary Examiner* — Michelle Chin
(74) *Attorney, Agent, or Firm* — JCIPRNET

(57) ABSTRACT

An image processing method, an image processing apparatus, and an image processing system are provided. In the method, a target object is determined in an original image to generate a labeling result. The labeling result includes a position of the target object in the original image. Multiple target images of the target object are generated according to the labeling result. The target images are generated by extracting image of the target object from the original image and changing an image size of the image of the target object. A corresponding target image is combined with the original image according to a zoom operation. The zoom operation is configured to change an image size for displaying the original image.

20 Claims, 11 Drawing Sheets

IMAGE PROCESSING METHOD, IMAGE PROCESSING APPARATUS, AND IMAGE PROCESSING SYSTEM

CROSS-REFERENCE TO RELATED APPLICATION

This application claims the priority benefit of Taiwanese application no. 111111079, filed on Mar. 24, 2022. The entirety of the above-mentioned patent application is hereby incorporated by reference herein and made a part of this specification.

BACKGROUND

Technical Field

The disclosure relates to an image processing technology. In particular, the disclosure relates to an image processing method, an image processing apparatus, and an image processing system.

Description of Related Art

Viewing a high-resolution whole slide image (WSI) is not limited to conventional pathological analysis with glass slides, so the WSI is convenient and efficient in terms of use, and assists professionals with judgment. Since this image imitates the view seen through a microscope by a person, the size of a complete high-resolution WSI file is massive. In addition, the WSI file (with a filename extension of sys, tiff, or ndpi, for example) is required to be read through an image processing library (e.g., OpenSlide Library) for a user to view details of the image at each layer.

It is worth noting that, to obtain results of manual lesion-related interpretation on such a massive image file, it requires reviewing each block one by one. Although labeling is available in pathology systems currently on the market, the labeled images cannot be stored considering data integrity. Therefore, it is required to re-interpret each detail every time an image file is opened in the pathology system, reducing the efficiency of interpretation.

SUMMARY

The embodiments of the disclosure provide an image processing method, an image processing apparatus, and an image processing system, in which lesion labeling results can be quickly provided during the process of image browsing.

According to an embodiment of the disclosure, an image processing method includes (but is not limited to) the following. A target object is determined in an original image to generate a labeling result. The labeling result includes a position of the target object in the original image. A plurality of target images of the target object are generated according to the labeling result. The target images are generated by extracting an image of the target object from the original image and changing an image size of the image of the target object. A corresponding one of the target images is combined with the original image according to a zoom operation. The zoom operation is configured to change an image size for displaying the original image.

According to an embodiment of the disclosure, an image processing apparatus includes (but is not limited to) a storage device and a processor. The storage device is configured to store a programming code. The processor is coupled to the storage device. The processor is configured to load and execute the programming code to determine a target object in an original image to generate a labeling result, generate a plurality of target images of the target object according to the labeling result, and combine a corresponding one of the target images with the original image according to a zoom operation. The labeling result includes a position of the target object in the original image. The target images are generated by extracting an image of the target object from the original image and changing an image size of the image of the target object. The zoom operation is configured to change an image size for displaying the original image.

According to an embodiment of the disclosure, an image processing system includes (but is not limited to) a viewer server and an inference server. The inference server determines a target object in an original image to generate a labeling result. The labeling result includes a position of the target object in the original image. The inference server generates a plurality of target images of the target object according to the labeling result. The target images are generated by extracting an image of the target object from the original image and changing an image size of the image of the target object. The viewer server combines a corresponding one of the target images with the original image according to a zoom operation. The zoom operation is configured to change an image size for displaying the original image.

Based on the foregoing, in the image processing method, the image processing apparatus, and the image processing system according to the embodiments of the disclosure, target images of different image sizes are generated, and the target image of the corresponding image size are combined with the original image in response to the zoom operation. Accordingly, efficiently labeling a high-resolution image can be achieved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
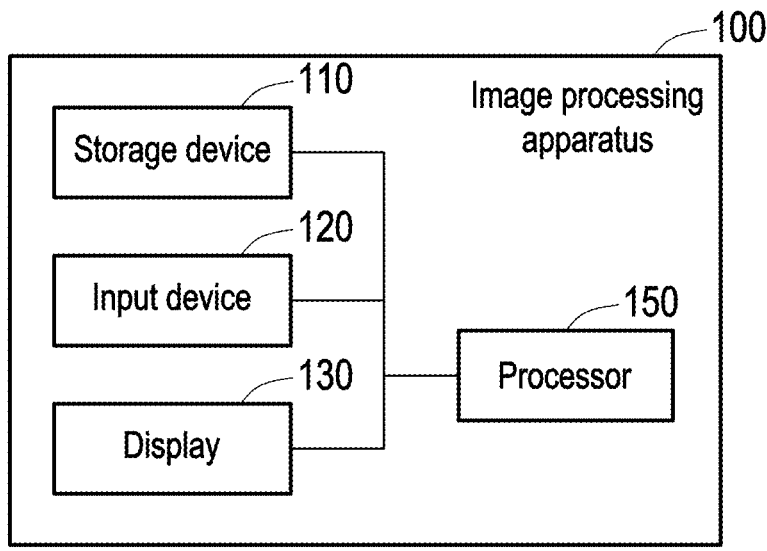
FIG. 1 is a block diagram of components of an image processing apparatus according to an embodiment of the disclosure.

FIG. 1 is a block diagram of components of an image processing apparatus 100 according to an embodiment of the disclosure. With reference to FIG. 1, the image processing apparatus 100 includes a storage device 110 and a processor 150. The image processing apparatus 100 may be a desktop computer, a notebook computer, a smart phone, a tablet computer, a server, a medical testing instrument, or other computing devices.

The storage device 110 may be any form of fixed or removable random access memory (RAM), read only memory (ROM), flash memory, hard disk drive (HDD), solid-state drive (SSD), or similar components. In an embodiment, the storage device 110 is configured to record programming codes, software modules, configurations, data, or files (e.g., an original image, a target image, a combined image, and a labeling result).

The processor 150 is coupled to the storage device 110. The processor 150 may be a central processing unit (CPU), a graphic processing unit (GPU), or any other programmable general-purpose or special-purpose microprocessor, digital signal processor (DSP), programmable controller, field programmable gate array (FPGA), application-specific integrated circuit (ASIC), neural network accelerator, or other similar components or a combination thereof. In an embodiment, the processor 150 is configured to perform all or some operations of the image processing apparatus 100, and may load and execute the programming codes, software modules, files, and data recorded by the storage device 110.

In some embodiments, the image processing apparatus 100 further includes an input device 120. The input device 120 may be a touch panel, mouse, keyboard, trackball, switch, or button. In an embodiment, the input device 120 is configured to receive a user operation, for example, a swipe, touch, press, or click operation.

In some embodiments, the image processing apparatus 100 further includes a display 130. The display 130 may be a liquid-crystal display (LCD), light-emitting diode (LED) display, organic light-emitting diode (OLED), quantum dot display, or other forms of display. In an embodiment, the display 130 is configured to display images.

The method according to an embodiment of the disclosure accompanied with the devices, components, and modules in the image processing apparatus 100 will now be described below. Each flow of the method may be adjusted according to the implementations, and is not limited thereto.

Figure 2:
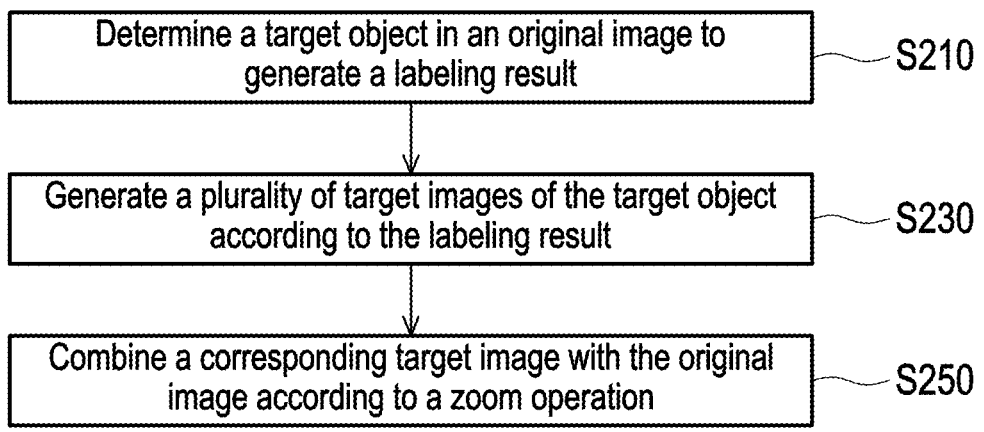
FIG. 2 is a flowchart of an image processing method according to an embodiment of the disclosure.

FIG. 2 is a flowchart of an image processing method according to an embodiment of the disclosure. With reference to FIG. 2, the processor 150 determines a target object in an original image to generate a labeling result (step S210). Specifically, the original image may be a medical image, a surveillance image, an image of product, or an image of figure, but the form thereof is not limited by the embodiments of the disclosure. For example, the original image is a whole slide image (WSI), a defect detection image for a production line, or an intersection surveillance image. For convenience of description, the following content only takes a medical image as an example, but the embodiments of the disclosure may still be applicable to other forms of images.

In an embodiment, the processor 150 provides a viewer to display the original image. The viewer is, for example, a web browser or a picture browser. In some embodiments, the processor 150 may display the viewer through the display 130 to present the original image.

Figure 3:
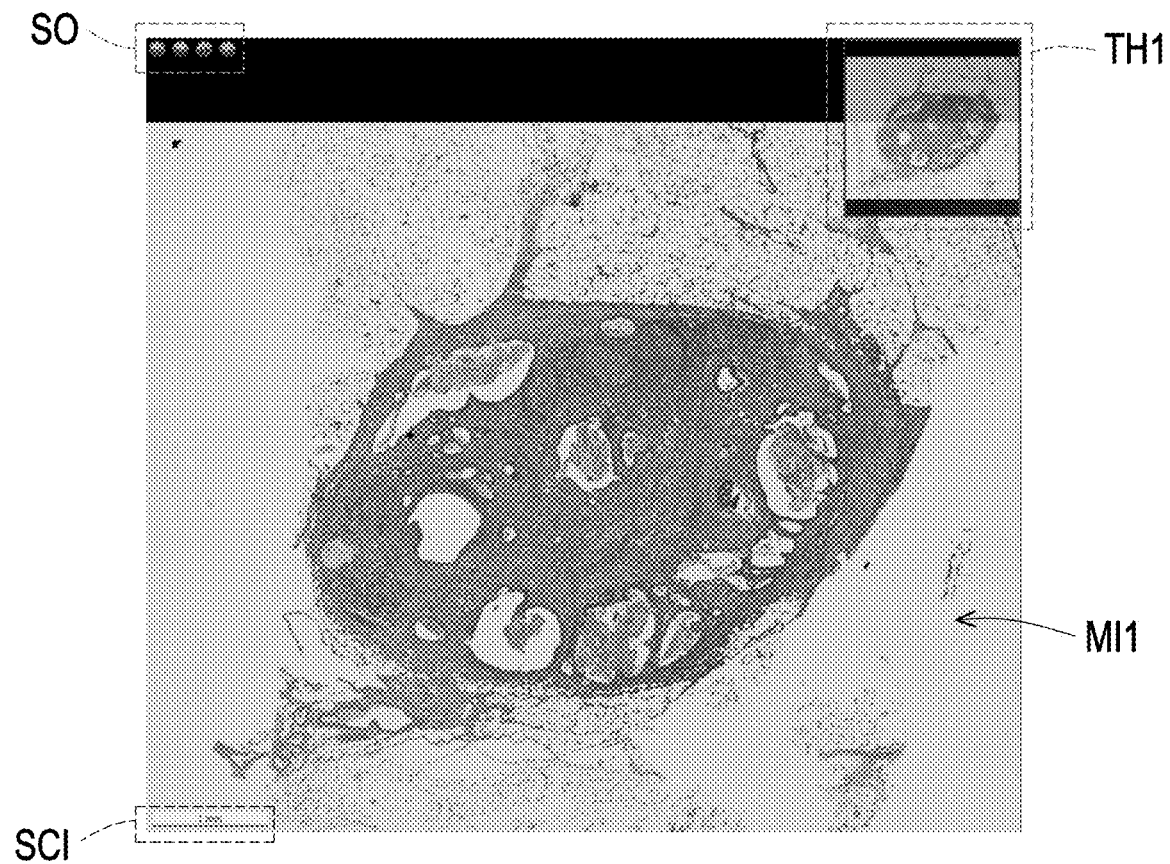
FIG. 3 is a schematic diagram illustrating a viewer displaying an original image according to an embodiment of the disclosure.

For example, FIG. 3 is a schematic diagram illustrating a viewer displaying an original image according to an embodiment of the disclosure. With reference to FIG. 3, in a viewer interface, an operation option SO, a thumbnail region TH1, and a ratio indication SCI are provided, and an original image MI1 may be displayed. The operation option SO includes, for example, virtual buttons of zoom-in, zoom-out, leftward, and rightward, and may receive a click operation of the user through the input device 120 for the original image MI1 to be zoomed in, zoomed out, moved leftward, or moved rightward. The thumbnail region TH1 presents the original image MI1 that is reduced in size. The ratio indication SCI is configured to indicate a zoom ratio of the original image MI1 presented by the viewer.

Figure 4:
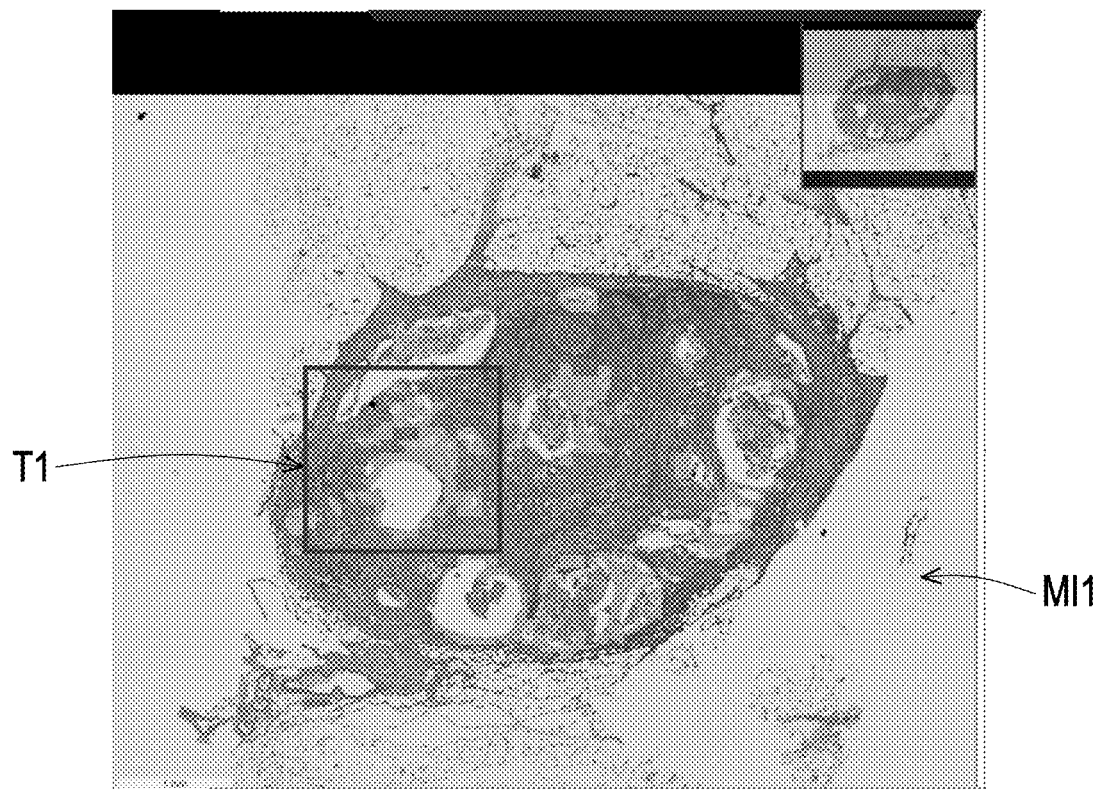
FIG. 4 is a schematic diagram illustrating a labeling result according to an embodiment of the disclosure.

The labeling result includes a position of the target object in the original image. The processor 150 may perform object detection on the original image to obtain the target object and the position thereof. The object detection is, for example, determining a region of interest (ROI) in the original image that corresponds to the target object (e.g., a person, a lesion, an object of a non-living body or a part thereof). The ROI may encompass the entirety or part of the target object. For example, FIG. 4 is a schematic diagram illustrating a labeling result according to an embodiment of the disclosure. With reference to FIG. 4, a region of interest T1 is the lesion (i.e., the target object) in the original image MI1 that is framed and selected with a bounding box.

In an embodiment, the shape of the ROI substantially or completely conforms to the outline of the target object in the original image, so that all or some pixels occupied by the target object in the original image are determined.

In an embodiment, the processor 150 may further identify the type of the target object (e.g., bump, lesion, male or female, dog or cat, table or chair, or the like).

In an embodiment, the processor 150 may for example realize object detection by applying a neural network-based algorithm (e.g., YOLO (you only look once), region-based convolutional neural networks (R-CNN), or fast R-CNN), or a feature matching-based algorithm (e.g., histogram of oriented gradient (HOG), Haar, or feature comparison of speeded up robust features (SURF).

The algorithm employed by the object detection is not limited by the embodiments of the disclosure. In an embodiment, it is also possible that an external device performs the object detection and provides the labeling result to the image processing apparatus 100. In another embodiment, the labeling result may also be obtained through the input device 120 receiving the labeling operation of the user on the target object performed on the viewer.

With reference to FIG. 2, the processor 150 generates a plurality of target images of the target object according to the labeling result (step S230). Specifically, after an image of the target object is extracted from the original image, a plurality of target images may be generated by changing an image size of the target image. In an embodiment, it is possible that any one of the target images includes only the target object. In other words, regions in the original image where the target object is not present are removed, for example, the background of the image is removed.

In an embodiment, the labeling result includes a mask array. The size of the mask array is completely or substantially the same as an image size of the original image. For example, elements in the mask array are in a one-to-one correspondence with pixels in the original image. Alternatively, the elements and the pixels are in a one-to-many or many-to-one correspondence. The mask array records the position of the target object in the original image. The mask array includes a first value and a second value. For example, the first value is one of 0 or 1, and the second value is the other one of 0 or 1. An element having the first value in the mask array indicates that the target object is present in its corresponding region (including one or more pixels) in the original image, and another element having the second value in the mask array indicates that the target object is not present in its corresponding region (including one or more pixels) in the original image.

For example, Table (1) is an example of mask array:

TABLE 1

| 0 | 0 | 0 | 0 | 0 | 0 |
| 0 | 0 | 0 | 0 | 0 | 0 |
| 0 | 0 | 0 | 0 | 0 | 0 |
| 0 | 1 | 0 | 0 | 0 | 0 |
| 0 | 1 | 1 | 0 | 0 | 0 |
| 0 | 1 | 1 | 1 | 0 | 0 |
| 0 | 1 | 1 | 0 | 0 | 0 |
| 0 | 1 | 0 | 0 | 0 | 0 |
| 0 | 0 | 0 | 0 | 0 | 0 |
| 0 | 0 | 0 | 0 | 0 | 0 |

The value "1" (i.e., the first value) indicates that the target object is present in the corresponding region of the original image, and the value "0" (i.e., the second value) indicates that the target object is not present in the corresponding region of the original image. Based on Table (1), it can be known that the target object is a triangle.

In an embodiment, the processor 150 may extract the region (i.e., the image region where the target object is present) in the original image corresponding to the element having the first value in the mask array. For example, the processor 150 may extract the color value, grayscale value, or sensed intensity value of each pixel in the region. In addition, the processor 150 generates the target image according to the extracted region. For example, the extracted region is overlaid on a blank image or an image with specified background (whose image size is the same or substantially the same as the original image) or the extracted region is converted into a specific color, shade, translucent layer, or other visual emphasis marks. Moreover, the position of the extracted region in the target image is the same as its position in the original image.

In an embodiment, the processor 150 may remove the region in the original image corresponding to the element having the second value in the mask array. For example, the processor 150 may compare the mask array with the original image, and convert the image region having the second value in the original image into a specific color or apply a specific background, such as a transparent background.

The above description is directed to generation of one target image, and the following description will be directed to multiple target images of a single original image. In an embodiment, the processor 150 may extract the image of the target object from the original image of an initial image size to serve as a first image among the target images. In addition, the processor 150 may change the first image from the initial image size into a changed image size to generate a second image among the target images. In other words, the processor 150 generates other target images by changing the image size of the target image. In an embodiment, the initial image size is a multiple of the changed image size, and the processor 150 may reduce or increase the size of the target image while maintaining the aspect ratio to generate another target image. For example, the processor 150 proportionally reduces the size of the first image by dividing the pixels by two, three, or five. In another embodiment, the processor 150 may directly specify the value of the changed image size regardless of whether the aspect ratio is maintained.

Figure 5:
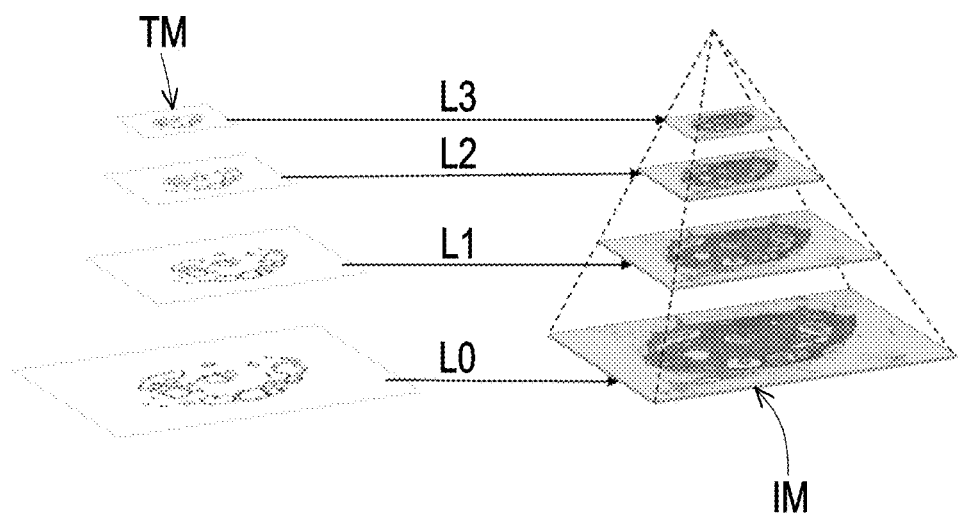
FIG. 5 is a schematic diagram illustrating multi-layer mapping according to an embodiment of the disclosure.

In an embodiment, the number of target images is equal to the number of layers of the original image. Different numbers of layers correspond to the original image zoomed at different ratios. For example, FIG. 5 is a schematic diagram illustrating multi-layer mapping according to an embodiment of the disclosure. With reference to FIG. 5, a layer L0 is an original image IM of the original ratio, a layer L1 is the original image IM with pixels reduced by 2 times, a layer L2 is the original image IM with pixels reduced by 4 times, and a layer L3 is the original image IM with pixels reduced by 8 times. The original image IM of each of the layers L0 to L3 corresponds to a target image TM having the same image size. Assuming that the layer L0 corresponds to a target image of 1024×1024, then the processor 150 may sequentially generate the target image of each layer of $1024/(2^x) \times 1024/(2^x)$, where x is 0 to 3. Therefore, the image of the layer L3 is 128×128. The zooming multiple of the layer is not limited to 2, nor is it fixed. In addition, the number of layers may also be 6, 7, 10, or other values.

In another embodiment, the processor 150 may also obtain the target image of each image size by reducing or increasing the size of the original image and performing object detection on the original image whose image size is changed.

Figure 6A:
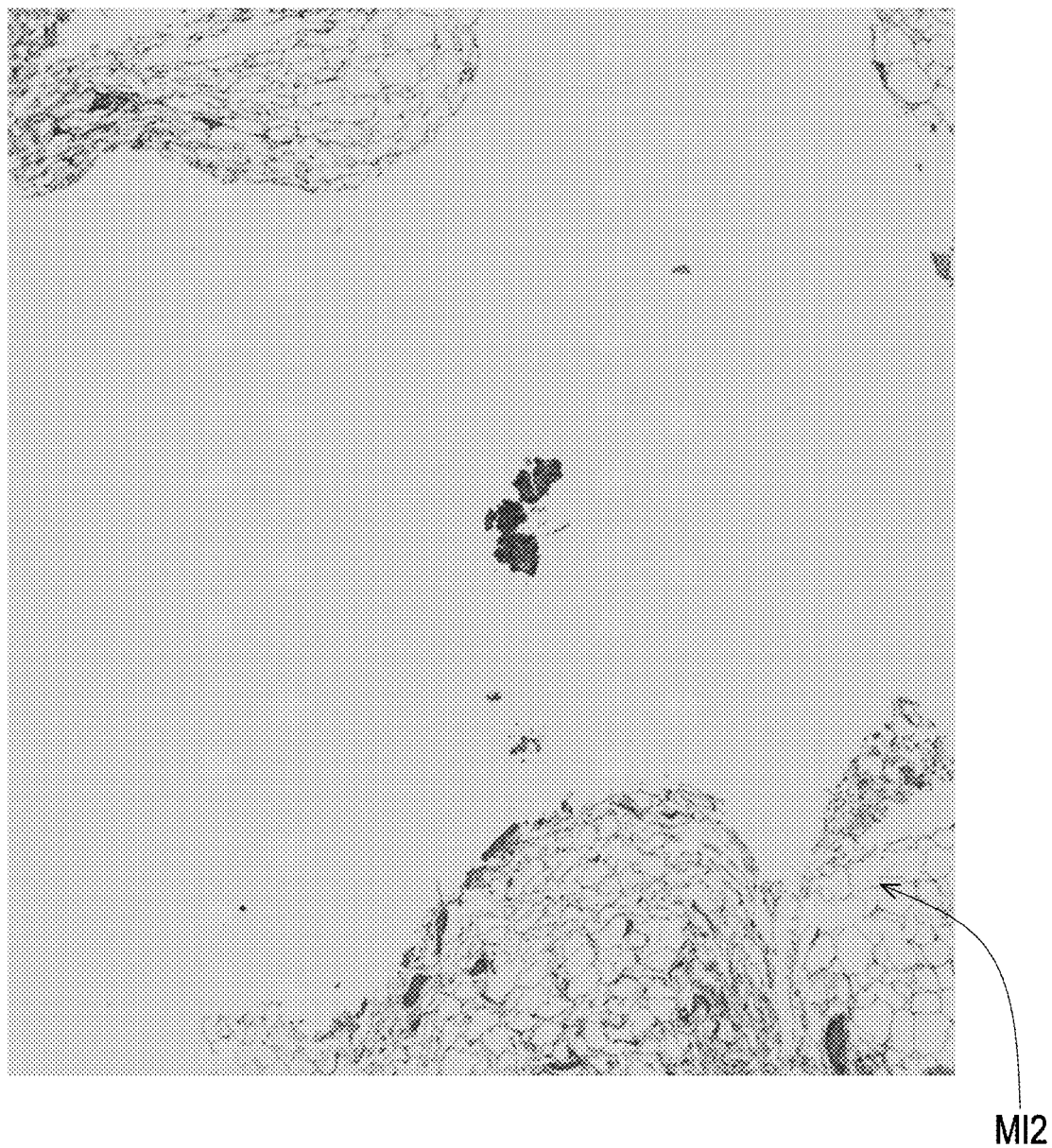
FIG. 6A is an exemplary illustration of an original image of a certain layer.
Figure 6B:
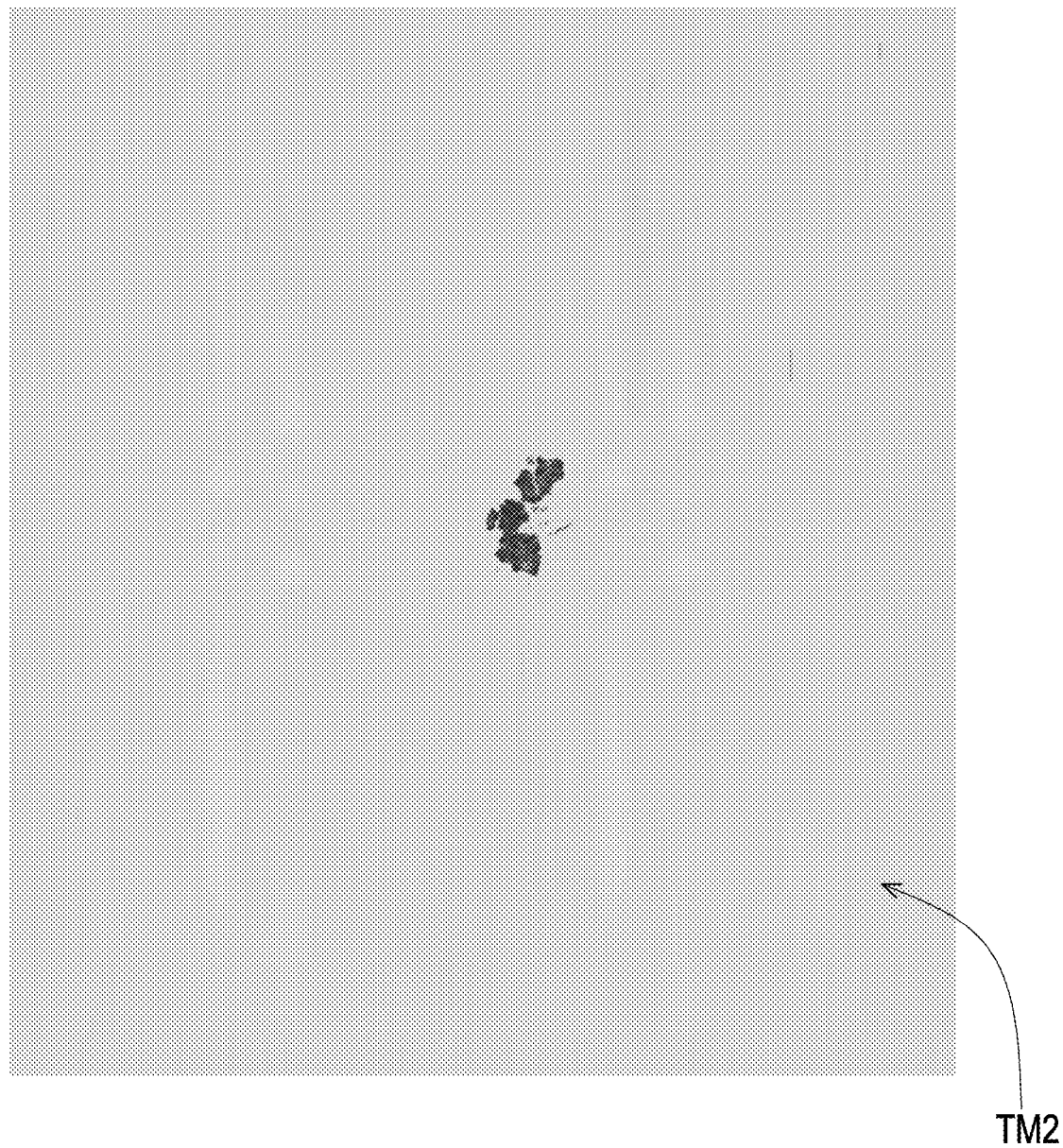
FIG. 6B is an exemplary illustration of a target image of a certain layer.

For example, FIG. 6A is an exemplary illustration of an original image MI2 of a certain layer, and FIG. 6B is an exemplary illustration of a target image TM2 of a certain layer. With reference to FIG. 6A and FIG. 6B, the target object alone is retained in the target image TM2.

Figure 7A:
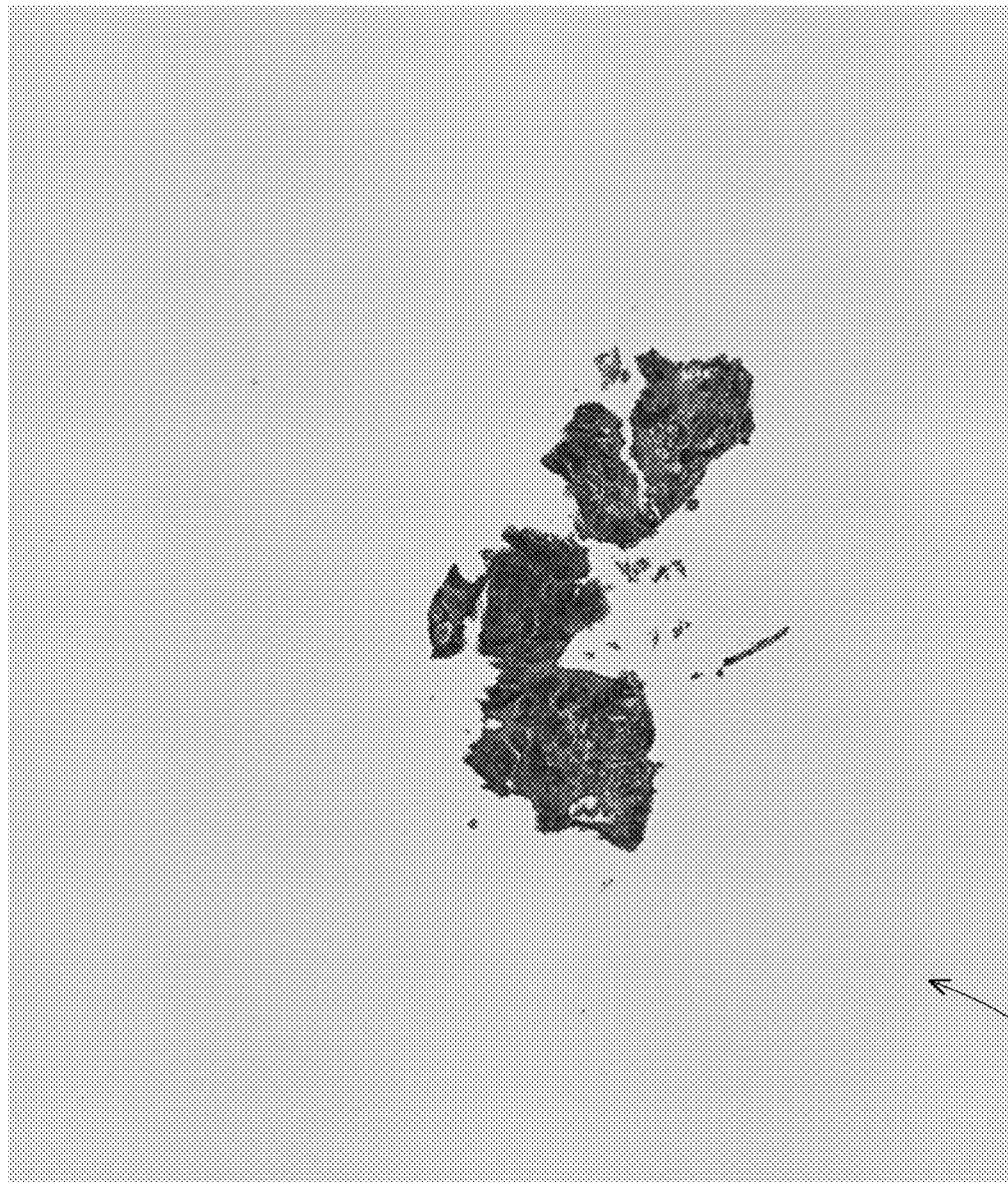
FIG. 7A is an exemplary illustration of an original image of another layer.
Figure 7B:
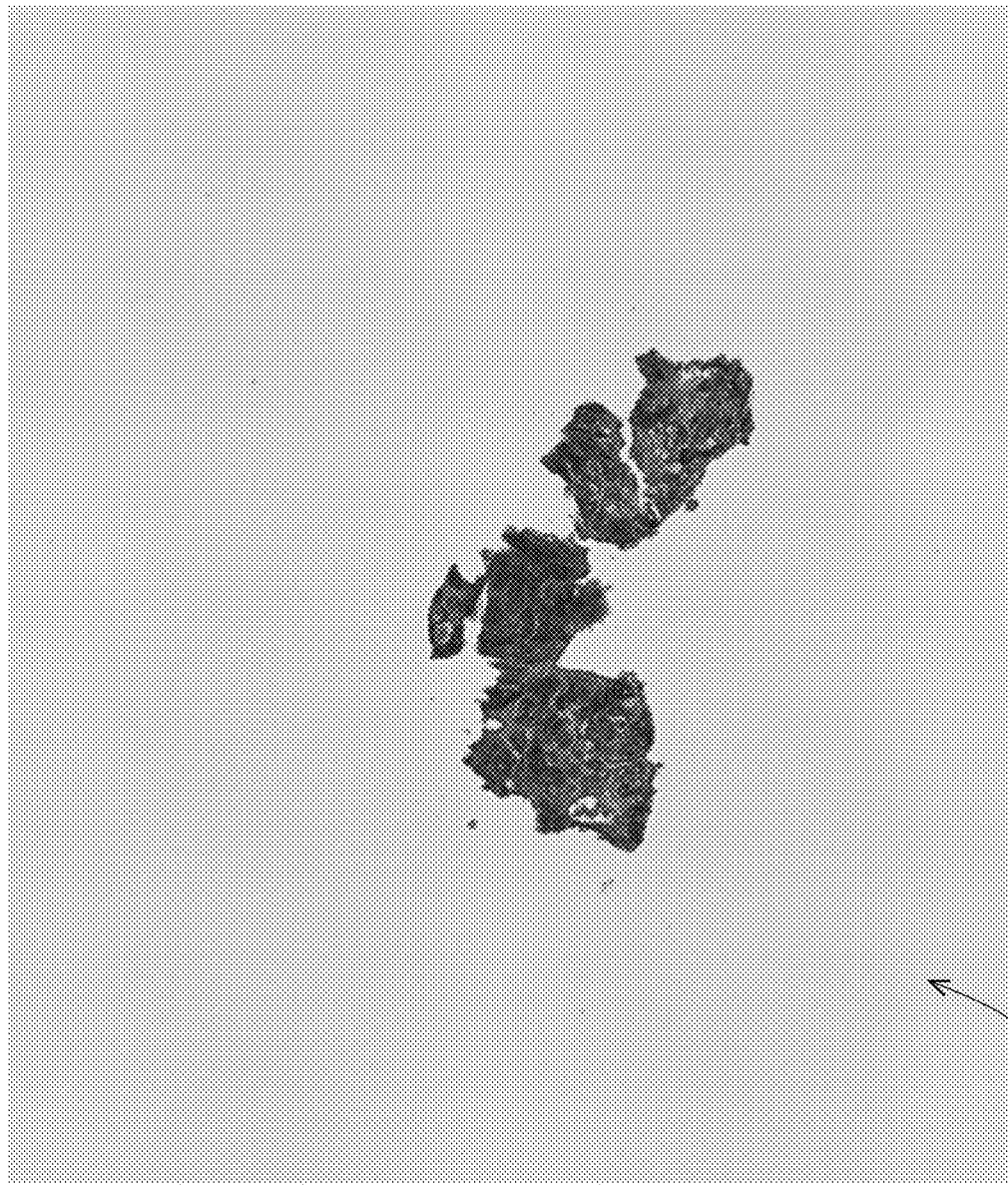
FIG. 7B is an exemplary illustration of a target image of another layer.

FIG. 7A is an exemplary illustration of an original image MI2 of another layer, and FIG. 7B is an exemplary illustration of a target image TM3 of another layer. With reference to FIG. 7A and FIG. 7B, the target object alone is retained in the target image TM3.

In an embodiment, the processor 150 may determine file locations/paths of the target images according to the image sizes of the target images. In a file system, a file location/path is related to a filename and/or a directory/folder. In an embodiment, the filename of the target image is related to the layer corresponding to the image size or the image size. The processor 150 may determine the filename of the target image according to the image size of the target image. For example, filenames of six target images are respectively Mask0, Mask1, Mask2, Mask3, Mask4, and Mask5. The processor 150 may store the target images in the same folder or different folders. In another embodiment, the directory/folder of the target images is related to the layer corresponding to the image size. For example, three target images are respectively stored in folders F0, F1, and F2. The processor 150 may also convert the corresponding layer into a file location according to a specific code or formula.

In an embodiment, the file location/path for storing the target images is a static path. In other words, the corresponding target image can be found on a fixed file path. In other embodiments, the file location/path of the target images may become a dynamic path according to a specific formula or look-up table and based on specific factors.

With reference to FIG. 2, the processor 150 combines a corresponding target image with the original image according to a zoom operation (step S250). Specifically, the zoom operation is configured to change an image size for displaying the original image. The zoom operation may be received through the input device 120. For example, the zoom operation is increasing or reducing the size of the image or directly changing the size into a specific image size. The zoom operation may also be transmitted through a command, message, or signal and configured to drive the processor 150 to change the presented image size.

In an embodiment, the processor 150 receives the zoom operation on the original image displayed by the viewer through the input device 120. Taking FIG. 3 as an example, the zoom-in and zoom-out virtual buttons in the operation option SO may receive a click operation of the user through the input device 120 for zooming in or zooming out.

In an embodiment, the number of layers provided for zooming is the same as the number of layers in the target images. For example, the viewer may provide magnifications of 2×, 4×, 8×, and 16×, and provide four target images.

In an embodiment, the processor 150 may select the corresponding target image according to the image size corresponding to the zoom operation, and combine the selected target image with the original image, that is, first read the target image and then combine the target image with the original image. In another embodiment, the processor 150 may first combine the target image with the original image of the same image size, and directly provide a combined image according to the zoom operation (i.e., the image generated by combining the target image with the original image), that is, first combine the target image with the original image and then read the combined image. For a file location of the combined image, reference may be made to the above description of the target image, which will not be repeated here.

Figure 8A:
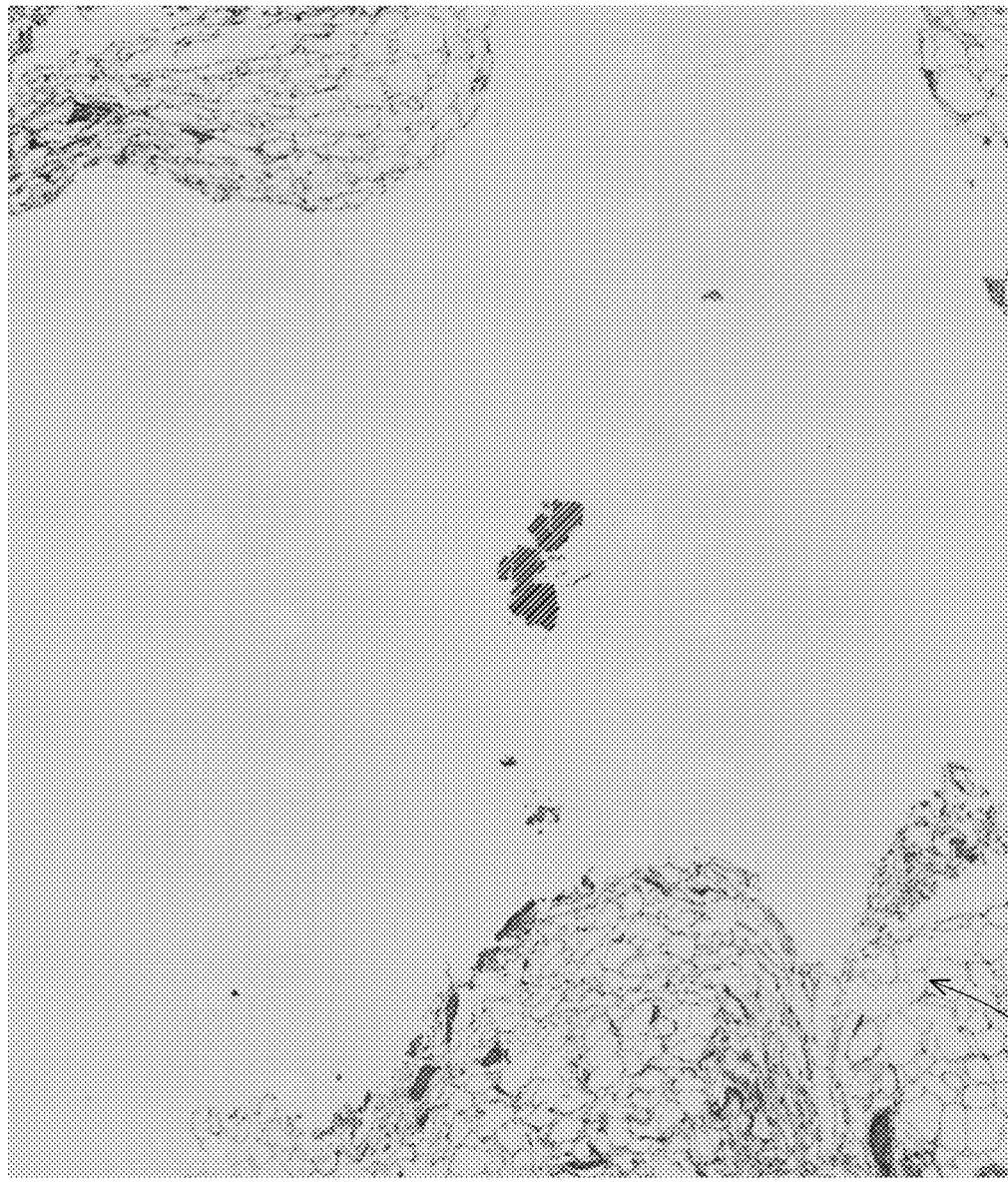
FIG. 8A is an exemplary illustration of a combined image of a certain layer.

FIG. 8A is an exemplary illustration of a combined image CI2 of a certain layer. With reference to FIG. 6A, FIG. 6B, and FIG. 8A, the combined image CI2 is the target image TM2 (as shown by the slashed shade) overlaid on the original image MI2.

Figure 8B:
FIG. 8B is an exemplary illustration of a combined image of another layer.

FIG. 8B is an exemplary illustration of a combined image CI3 of another layer. With reference to FIG. 7A, FIG. 7B, and FIG. 8B, the combined image CI3 is the target image TM3 (as shown by the slashed shade) overlaid on the original image MI2.

In an embodiment, the processor 150 may convert a ratio corresponding to the zoom operation into an identification code. For example, a zoom operation of 2× is converted into an identification code of "1". The conversion may be based on a mathematical formula or a look-up table. The processor 150 may obtain the file location corresponding to the target image or corresponding to the combined image according to the identification code. For example, the identification code of "1" corresponds to a target image with a filename of "mask1". The processor 150 may obtain a matching target image according to the obtained file location. Alternatively, the processor 150 may obtain a matching combined image according to the obtained file location.

In an embodiment, the processor 150 may display the original image, the target image, and/or the combined image through the display 130.

Figure 9:
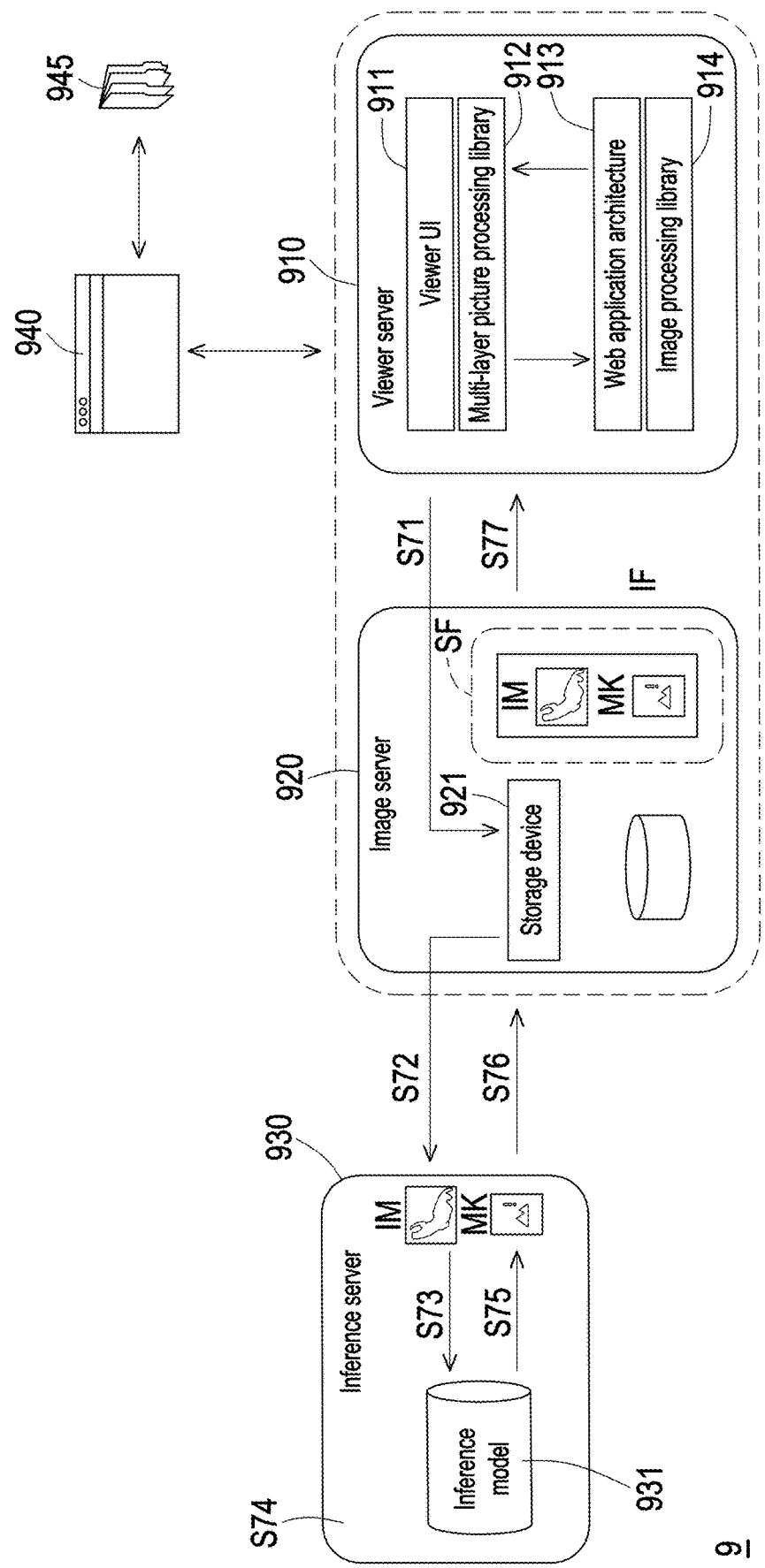
FIG. 9 is a schematic diagram of an image processing system and a flowchart of image processing thereof according to an embodiment of the disclosure.

In addition, the disclosure further provides an image processing system. All or some functions of the image processing apparatus 100 may be realized on different independent devices in the system. FIG. 9 is a schematic diagram of an image processing system 9 and a flowchart of image processing thereof according to an embodiment of the disclosure. With reference to FIG. 9, the image processing system 9 includes (but is not limited to) a viewer server 910, an image server 920, and an inference server 930.

The viewer server 910 is, for example, a web server, and is configured for viewing, search, storage, or access by a web browser 940 (i.e., a viewer). The viewer server 910 includes (but is not limited to) a viewer user interface (UI) 911, a multi-layer picture processing library 912 (e.g., OpenSeaDragon), a web application architecture 913 (e.g., Python Flask), and an image processing library 914 (e.g., OpenSlide).

For example, OpenSeaDragon employed at the frontend is an open source software (OSS) program based on web service architecture, in which zoomable images may be viewed through the web browser 940, which is convenient for the user to view high-resolution multi-layer images. Openslide employed at the backend can parse large files with a filename extension of sys, tiff, or ndpi, for example, and the backend system can be realized through the Python Flask framework.

The image server 920 includes a storage device 921 and is configured for a target image MK, the original image IM, and/or the combined image to be stored or read (i.e., for file management).

The inference server 930 includes an inference model 931 (which is based on a neural network, for example) and is configured to detect a target object in the original image IM.

The image server 920 may receive the original image IM from a local folder 945, and store the original image IM in a predetermined static or dynamic folder (step S71). The image server 920 may provide the original image IM to the inference server (step S72). Next, the inference server 930 may input the original image IM to the inference model 931 (step S73), and accordingly detect the target object in the original image IM to generate a labeling result (step S74). The labeling result includes a position of the target object in the original image IM. The inference server 930 may generate a plurality of target images MK of the target object according to the labeling result (step S75). The target images MK are generated by extracting an image of the target object from the original image IM and changing an image size of the image of the target object. For example, the filenames respectively are Mask0.png, Mask1.png, Mask2.png, Mask3.png, Mask4.png, and Mask5.png. The inference server 930 may store the plurality of target images MK in the image server 920 (step S76). The viewer server 910 may combine the corresponding target image MK with the original image IM according to a zoom operation (step S77). The zoom operation is configured to change an image size for displaying the original image IM. For the detailed description of steps S71 to S77, reference may be made to the description of FIG. 1 to FIG. 8B, which will not be repeated here.

In an embodiment, the inference server 930 may determine file locations of the target images in the image server 920 according to image sizes of the target images. The viewer server 910 may convert a ratio corresponding to the zoom operation into an identification code. The viewer server 910 may obtain the file location corresponding to the target image according to the identification code, and obtain the target image according to the obtained file location. For example, if the identification code of the zoom operation is 3, the viewer server 910 reads the target image MK whose filename is Mask3.png.

In an embodiment, the image server 920 may return a file location/path IF of the target image MK and set the file location/path on a static path SF for the viewer server 910 (i.e., the frontend) to directly read the corresponding target image MK, reducing delay in reading. After the viewer receives an operation to display the target object, the viewer server 910 may directly read the file (i.e., the target image MK) on the static path and overlay the same on the original image IM. Accordingly, the labeling on high-resolution images can be achieved.

Figure 10:
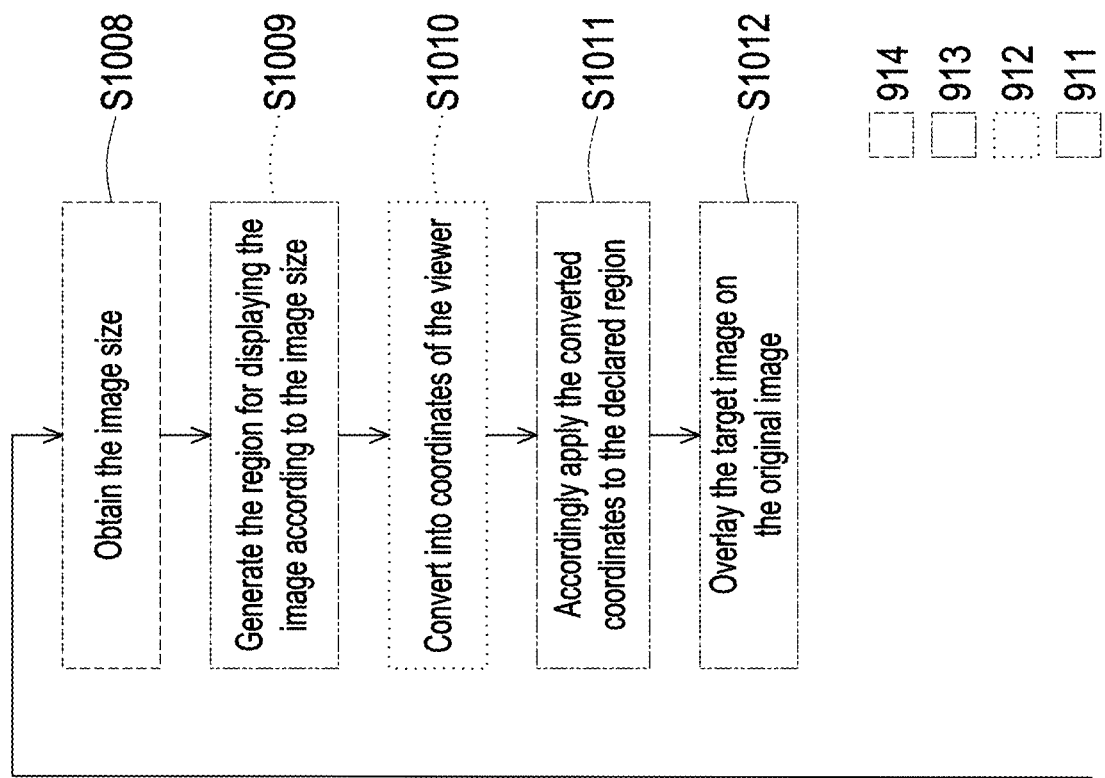
FIG. 10 is a flowchart of image combination according to an embodiment of the disclosure.
Figure 10:
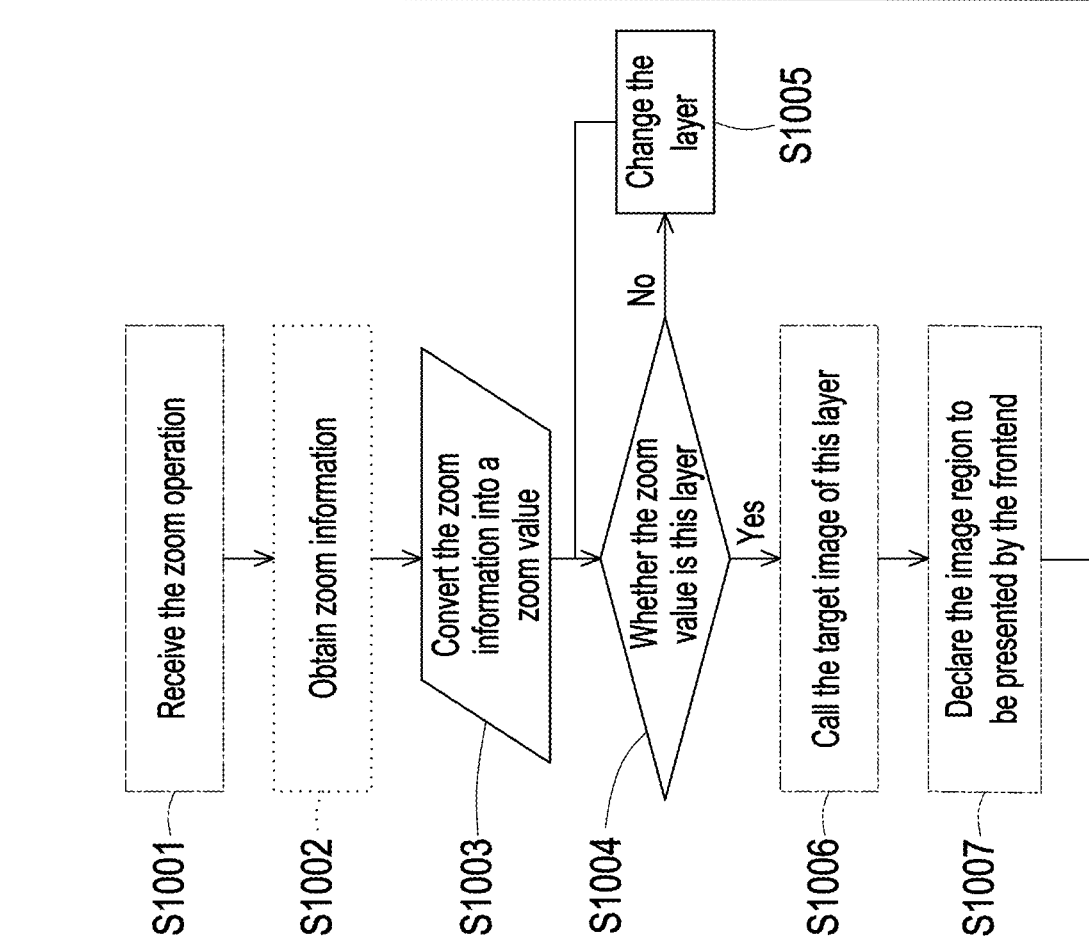

FIG. 10 is a flowchart of image combination according to an embodiment of the disclosure. With reference to FIG. 10, when the web browser 940 receives a zoom operation (e.g., zoom-in/zoom-out) (step S1001), zoom information (e.g., the ratio corresponding to the zoom operation) of the currently presented original/target/combined image may be obtained through the multi-layer picture processing library 912 (step S1002). Next, a layer corresponding to the zoom information is determined. For example, the zoom information is input and a variable x is initialized to 1. The zoom information may be converted into a zoom value (step S1003). It is determined whether the zoom value is this layer (step S1004). If so, the flow proceeds to step S1006 to call the target image of this layer; if not, the flow proceeds to step S1005 to change the layer until it is determined that the zoom value corresponds to this layer in step S1004. For example, it is determined that the zoom value is greater than 2^x in step S1004, and the flow proceeds to step S1005 to change the zoom value. As long as the zoom value is greater than 2^x, the layer is changed (e.g., x+1) (step S1005) until the zoom value is less than or equal to 2^x. If the layer corresponding to the zoom value of less than or equal to 2^x has been obtained, the layer is available for the viewer UI 911 to call the target image MK corresponding to the layer depending on the requirements (step S1006). The viewer UI 911 may declare the image region (i.e., the region for presenting the target image MK) to be presented by the frontend (step S1007), and place the obtained target image in the declared region (e.g., a Canvas-Div border).

The presented image may in advance be switched to by the image processing library 914 and converted into a coordinate size relative to the viewer by the multi-layer picture processing library 912 to be displayed. Therefore, to achieve post-image combining, the length and width of the image size which are adjusted to by the current zoom operation may be read through the image processing library 914 (step S1008). The image size may be substituted into functions of the multi-layer picture processing library 912 to obtain the results (i.e., generate an region for displaying the image size) of the position (which is converted into coordinates, for example) and size (x, y, width, height) for displaying the image according to the image size (step S1009). For example, the multi-layer picture processing library 912 generates a rectangle of the image size and takes the coordinates of the upper left corner of the rectangle as (0,0). The multi-layer picture processing library 912 may accordingly convert the rectangle and the corresponding coordinates into a pixel size and coordinates relative to the viewer (step S1010). Next, the viewer UI 911 may accordingly apply the converted coordinates to the previously declared region (e.g., the Canvas-Div border) (step S1011), to overlay the target image MK on the original image IM (step S1012).

All or some functions of the servers above may also be integrated or distributed to different devices. In addition, the number of servers is not limited to three.

In summary of the foregoing, in the image processing method, the image processing apparatus, and the image processing system according to the embodiments of the disclosure, the image of the target object that is determined in the original image is obtained, and the plurality of target images corresponding to different layers are generated. When the zoom operation is received, it is possible to quickly access the target image and provide the combined image of the target image combined with the original image. Accordingly, the efficiency in viewing images and providing labeling results can be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image processing method comprising:
   determining a target object in an original image to generate a labeling result, wherein the labeling result comprises a position of the target object in the original image;
   generating a plurality of target images of the target object according to the labeling result, wherein the target images are generated by extracting an image of the target object from the original image and changing an image size of the image of the target object; and
   combining a corresponding one of the target images with the original image according to a zoom operation, wherein the zoom operation is configured to change an image size for displaying the original image.

2. The image processing method according to claim 1, further comprising:
   providing a viewer to display the original image; and
   receiving the zoom operation on the original image displayed by the viewer.

3. The image processing method according to claim 1, wherein the labeling result comprises a mask array, the mask array records the position of the target object in the original image, the mask array comprises a first value and a second value, an element having the first value in the mask array indicates that the target object is present in a region in the original image corresponding to the element having the first value, and another element having the second value in the mask array indicates that the target object is not present in a region in the original image corresponding to the element having the second value, and wherein generating the target images of the target object according to the labeling result comprises:
   extracting the region in the original image corresponding to the element having the first value in the mask array; and
   generating the target images according to the region that is extracted.

4. The image processing method according to claim 3, wherein generating the target images comprises:
   removing the region in the original image corresponding to the element having the second value in the mask array.

5. The image processing method according to claim 1, wherein generating the target images of the target object according to the labeling result comprises:

extracting the image of the target object from the original image of an initial image size to serve as a first image among the target images; and changing the first image from the initial image size into a changed image size to generate a second image among the target images.

6. The image processing method according to claim 5, wherein the initial image size is a multiple of the changed image size.

7. The image processing method according to claim 1, wherein generating the target images of the target object according to the labeling result comprises:

determining file locations of the target images according to image sizes of the target images.

8. The image processing method according to claim 7, wherein combining the corresponding one of the target images with the original image according to the zoom operation comprises:

converting a ratio corresponding to the zoom operation into an identification code;

obtaining the file location corresponding to one of the target images according to the identification code; and obtaining the one of the target images according to the file location that is obtained.

9. The image processing method according to claim 7, wherein determining the file locations of the target images according to the image sizes of the target images comprises:

determining filenames of the target images according to the image sizes of the target images; and storing the target images to a folder.

10. An image processing apparatus comprising:

a storage device configured to store a programming code; and a processor coupled to the storage device and configured to load and execute the programming code to:

determine a target object in an original image to generate a labeling result, wherein the labeling result comprises a position of the target object in the original image;

generate a plurality of target images of the target object according to the labeling result, wherein the target images are generated by extracting an image of the target object from the original image and changing an image size of the image of the target object; and combine a corresponding one of the target images with the original image according to a zoom operation, wherein the zoom operation is configured to change an image size for displaying the original image.

11. The image processing apparatus according to claim 10, wherein the processor is further configured to:

provide a viewer to display the original image; and receive the zoom operation on the original image displayed by the viewer.

12. The image processing apparatus according to claim 10, wherein the labeling result comprises a mask array, the mask array records the position of the target object in the original image, the mask array comprises a first value and a second value, an element having the first value in the mask array indicates that the target object is present in a region in the original image corresponding to the element having the first value, and another element having the second value in the mask array indicates that the target object is not present in a region in the original image corresponding to the element having the second value, and wherein the processor is further configured to:

extract the region in the original image corresponding to the element having the first value in the mask array; and generate the target images according to the region that is extracted.

13. The image processing apparatus according to claim 12, wherein the processor is further configured to:

remove the region in the original image corresponding to the element having the second value in the mask array.

14. The image processing apparatus according to claim 10, wherein the processor is further configured to:

extract the image of the target object from the original image of an initial image size to serve as a first image among the target images; and change the first image from the initial image size into a changed image size to generate a second image among the target images.

15. The image processing apparatus according to claim 14, wherein the initial image size is a multiple of the changed image size.

16. The image processing apparatus according to claim 10, wherein the processor is further configured to:

determine file locations of the target images according to image sizes of the target images.

17. The image processing apparatus according to claim 16, wherein the processor is further configured to:

convert a ratio corresponding to the zoom operation into an identification code;

obtain the file location corresponding to one of the target images according to the identification code; and obtain the one of the target images according to the file location that is obtained.

18. The image processing apparatus according to claim 16, wherein the processor is further configured to:

determine filenames of the target images according to the image sizes of the target images; and store the target images to a folder.

19. An image processing system comprising:

a viewer server; and an inference server, wherein the inference server determines a target object in an original image to generate a labeling result, wherein the labeling result comprises a position of the target object in the original image;

the inference server generates a plurality of target images of the target object according to the labeling result, wherein the target images are generated by extracting an image of the target object from the original image and changing an image size of the image of the target object; and the viewer server combines a corresponding one of the target images with the original image according to a zoom operation, wherein the zoom operation is configured to change an image size for displaying the original image.

20. The image processing system according to claim 19, further comprising:

an image server storing the target images generated by the inference server, wherein the inference server determines file locations of the target images in the image server according to image sizes of the target images;

the viewer server converts a ratio corresponding to the zoom operation into an identification code;

the viewer server obtains the file location corresponding to one of the target images according to the identification code; and the viewer server obtains the one of the target images according to the file location that is obtained.

* * * * *